United States Patent

Suntop et al.

[15] 3,673,330

[45] June 27, 1972

[54] TWO-PARTY AUTOMATIC NUMBER IDENTIFICATION IN SUBSCRIBER CARRIER TELEPHONE SYSTEM

[72] Inventors: Morris A. Suntop; Uno Randmere, both of Rochester, N.Y.

[73] Assignee: Stromberg-Carlson Corporation, Rochester, N.Y.

[22] Filed: Sept. 18, 1970

[21] Appl. No.: 73,559

[52] U.S. Cl. ....................179/2.5 R, 179/15 BY, 179/84 VF

[51] Int. Cl. ....................H04j 1/14

[58] Field of Search ....................179/2.5, 8.5, 15 BY, 17 A, 179/17 E, 18 FH, 84 VF

[56] References Cited

UNITED STATES PATENTS

| | | | |
|---|---|---|---|
| 2,932,694 | 4/1960 | Hawks | 179/2.5 R |
| 2,966,553 | 12/1960 | Wadsworth | 179/8.5 |
| 2,957,950 | 10/1960 | Holman | 179/17 E |
| 2,820,848 | 1/1958 | Horwitz | 179/8.5 |
| 2,782,259 | 2/1957 | Dimond | 179/8.5 |

*Primary Examiner*—William C. Cooper
*Assistant Examiner*—David L. Stewart
*Attorney*—Hoffman Stone and Charles C. Krawczyk

[57] ABSTRACT

Automatic number identification for two subscribers who share a single channel in a subscriber carrier system. A d.c. ground connection is made to the subset of one of the two subscribers but not to the other's. When the subscriber having the ground connection goes offhook, initiating transmission of the inbound carrier signal, the subscriber equipment modulates the inbound carrier for a brief interval with a signal at a frequency higher than the highest voice signal permitted on the line. The subscriber carrier terminal equipment at the central office responds to the modulating signal by actuating a relay which remains held up for the duration of the call and effects a ground connection detectable by the conventional automatic number identification equipment at the central office. If the non-grounded subscriber goes offhook, the inbound carrier signal is not modulated and the relay at the central office remains non-energized. The system is not susceptible to "talkdown," because the modulating signal is outside the pass band provided for transmitting voice signals.

The circuit for sensing which of the two subscribers is offhook includes a transistor, means for grounding the base of the transistor during the identification interval, and means connecting an unreferenced source of direct current between the collector and emitter of the transistor in series with a relay winding. If the offhook subscriber has a d.c. ground connection, the current source becomes referenced by it, and the transistor becomes biased to saturation and conducts current to energize the relay. If the subscriber does not have a ground connection, the current source is referenced only through the base connection and the transistor does not conduct.

3 Claims, 2 Drawing Figures

INVENTORS
MORRIS A. SUNTOP
UNO RANDMERE
BY
[signature]
ATTORNEY

TWO-PARTY AUTOMATIC NUMBER IDENTIFICATION IN SUBSCRIBER CARRIER TELEPHONE SYSTEM

BRIEF DESCRIPTION

This invention relates to a novel arrangement for automatic number identification in a subscriber carrier telephone system in which two parties share a single channel.

Subscriber carrier telephone systems are well known. They are used between a central office and subscribers, as contrasted with multiplex systems used between central offices only. They generally provide up to about seven channels. Multiplexing is on a frequency-divided basis. Two carrier signals are used for each channel to provide directional discrimination. In general, the outgoing carrier signals, the ones used to transmit from the central office to the subscribers, are continuously and constantly on the line. The inbound carrier signals, those used to transmit from the respective subscribers to the central office, appear on the line only when the respective subscribers are offhook, and are discontinued when the subscribers are onhook. The subscriber carrier terminal equipment at the central office detects offhook conditions at the subscriber stations by sensing the appearance of the respective inbound carrier signals. Ringing of the subscriber subsets is done by transmitting a ring signal at relatively low energy levels on the carrier signals. The low level ring signal is demodulated at the subscriber terminal and amplified to the level necessary to actuate the ringer in the subset.

Heretofor, several different systems have been proposed for automatic number identification among several subscribers who share a single channel in systems of this kind. They have usually entailed the transmission of identifying signals of different respective frequencies, equipment being provided to transmit a signal at a different frequency for each respective subscriber. The previously proposed number identification arrangements have not been widely accepted, however, primarily, it is thought, because of the relatively high cost of the equipment needed for them. Moreover, with the growth of the telephone systems in this country, the number of lines or channels serving more than two parties has been very greatly reduced and the trend appears to be toward private lines and toward limiting party lines to two-party service only.

Many automatic telephone exchanges include equipment for automatic number identification on two-party lines by testing at the initiation of a call to ascertain whether there is a d.c. ground connection to the line. The system most widely in use provides for a d.c. ground connection at the subset of only one of the parties on a two-party line. When a call is initiated, therefore, the central office can identify which subscriber is on the line by the presence or absence of the ground connection and bill the call accordingly.

When the central office is connected to a subscriber carrier system, however, the situation is different. All of the subscribers on the line are connected to the central office through the same pair of conductors, and the simple ground vs. nonground test cannot be used.

Briefly, the present invention provides a signalling arrangement between the central office terminal and the subscriber terminals of the subscriber carrier system to close a d.c. ground connection at the interface between the subscriber carrier terminal at the central office and the central office switching gear when a selected one of two parties who share a single channel goes offhook. In effect, the subscriber carrier equipment modified in accordance with the invention presents to the central office number identification system a simulation of an ordinary two-party line, and the central office responds to each call as though it originated on a conventional two-party line.

A d.c. ground connection is made at the subset of one of the two subscribers, but not at the other's, and party identification is made in the first instance by a detector in the subscriber terminal, which causes transmission of an identifying signal when the grounded subset goes offhook, but not otherwise. The identifying signal is selected at a frequency slightly higher than the upper end of the pass band of the filter in the voice transmission channel. It is, therefore, not heard by the subscriber, and the subscriber cannot "talk down" the system by transmitting a false signal from his hand set. There is a toggle circuit at the central office which is set in response to the identifying signal and remains set so long as the inbound carrier is on the line.

The detector at the subscriber terminal includes a transistor with its collector and emitter connected in series with a relay coil between the poles of the unreferenced local battery. During a brief interval following offhook detection, the base of the transistor is grounded, and if the battery voltage is separately referenced during this interval, the transistor conducts to energize the relay. If, during the interval, the battery voltage remains unreferenced, the transistor does not conduct and the relay is not energized.

DETAILED DESCRIPTION

Figures 1, 2:
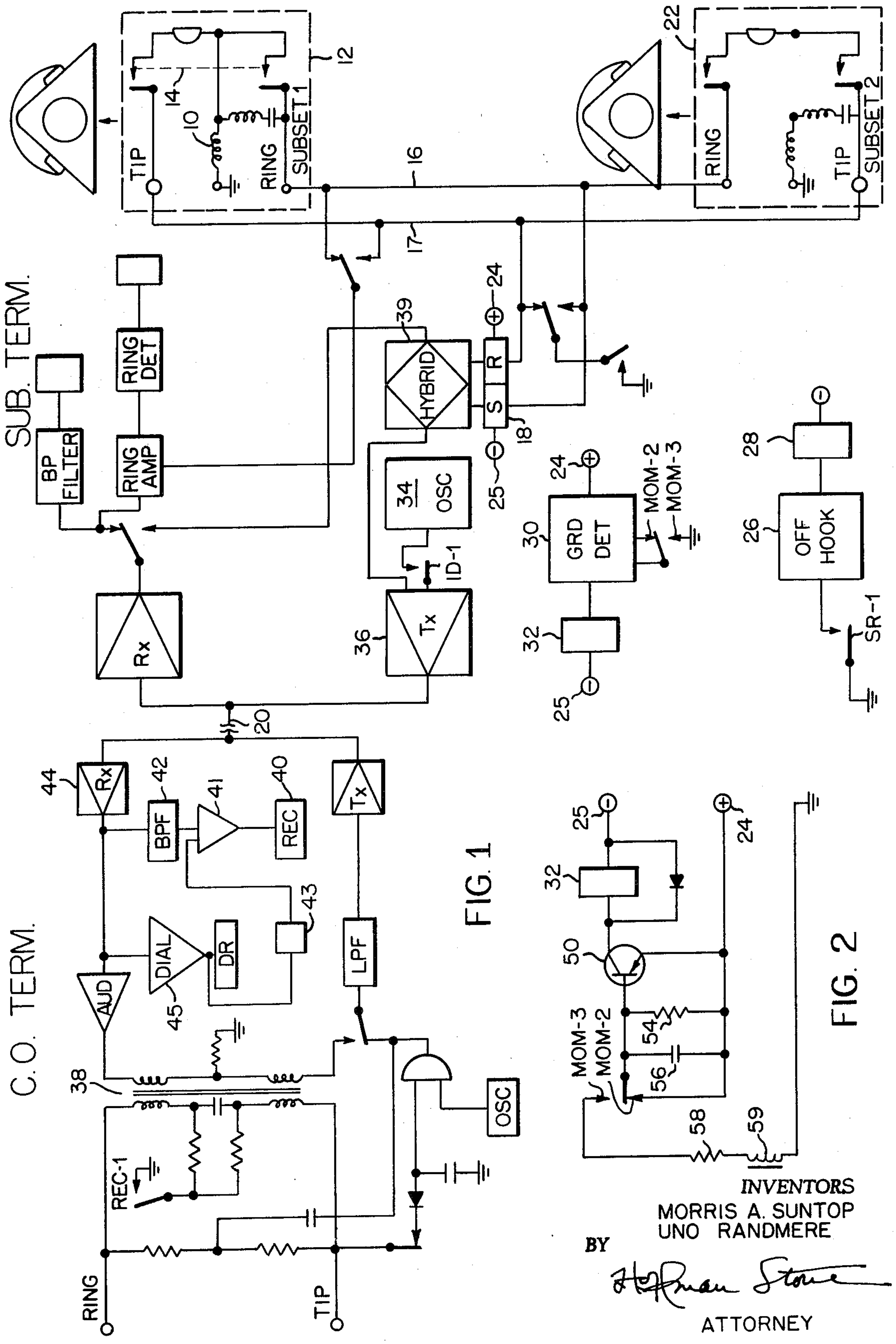

The presently preferred embodiment of the invention will now be described in detail in connection with the accompanying drawing wherein:

FIG. 1 is a block diagram of a subscriber carrier telephone system modified in accordance with the invention to provide for two-party automatic number identification; and FIG. 2 is a schematic circuit diagram of the identifying detector at the subscriber terminal.

In accordance with the invention, a d.c. ground connection is made through the ringer coil 10 at the first subscriber's subset 12 in the conventional way so that closing of the subscriber's hookswitch 14 completes a d.c. connection between the ring lead 16 of the two-party line and ground through one-half of the ringer coil 10. When the first subset 12 goes offhook, this ground connection provides a d.c. reference for the local battery, which is applied through a signalling relay 18 between the ring and tip leads 16 and 17. (A separate subscriber terminal with its own isolated battery is provided for each channel in the system).

When either of the two parties 12 and 22 goes offhook, a d.c. circuit is completed between the ring and tip leads 16 and 17, drawing enough current to energize the coil 18 of the signalling relay, which then closes its contact SR–1 to energize the offhook detector 26. In response to energization, the offhook detector 26 energizes a momentary relay 28 for an interval of about 400 milliseconds. Following this interval, the momentary relay 28 drops out and remains dropped until the offhook detector 26 is again energized following de-energization.

If there is no reference for the battery during the interval that the momentary relay 28 is picked up, the detector 30 does not operate, and only the unmodulated carrier signal is transmitted from the subscriber terminal to the central office. If, however, the battery is referenced during this interval through the d.c. ground connection at the first subset 12, the identifying detector 30 operates to energize the identifying relay 32, which closes its contacts ID–1. Closing of the contacts ID–1 energizes the identifying oscillator 34, the output of which is applied to modulate the transmitter 36 with a signal at a frequency outside the pass band of the voice transmission path. Ordinarily, the voice signal transmission is limited to signals below about 3.5 KHz. by filters (not shown) and the identifying oscillator may conveniently be designed to operate at about 3.8 to about 3.9 KHz.

At the end of the momentary transmission, when the momentary relay 28 drops out, the identifying detector 30 is disabled and the identifying oscillator 34 is de-energized.

The identifying signal modulating the carrier from the subscriber terminal is detected at the central office terminal by a relay 40, which is connected through a band pass filter 42 to the output of the receiver 44. The receiver 44 is assigned to the particular channel, and it amplifies and demodulates the signal received from the channel. If the identifying modulation is present, it passes through the filter 42 and an amplifier 41 to energize the relay 40. When the relay 40 is energized it closes its normally open contacts REC–1 to place a d.c. ground connection at the center tap of the primary winding of the hybrid transformer 38. The ground connection through the contacts REC–1 is detected by the central office number identification system in the same way that the system would detect a subscriber's ground connection on an ordinary two-party line. The central office number identification system is thus enabled to distinguish between the two parties 12 and 22 on the multiplexed line without any special modifications in the central office itself. The relay 40 is self-holding, and remains picked up for the duration of the call. It is reset to its released condition in response to the dropping of a release relay 43, which is held picked up during the call by the output of the dial pulse amplifier 45. Only the carrier system components are different from those heretofore known.

Other portions of the circuit shown in the drawing but not referenced or described herein have to do with a system for selectively ringing the two subscribers 12 and 22, as described and claimed in our co-pending application filed concurrently herewith, Ser. No. 73,560, entitled, "Selective Ringing in Subscriber Carrier Telephone System," and assigned to the same assignee.

THE DETECTOR

The circuit of the identifying detector 30 is shown in detail in FIG. 2 and includes a transistor 50 with its base normally connected directly to its emitter through the normally closed back contact MOM–2 of the momentary relay 28. The collector of the transistor 50 is connected through the winding of the identifying relay 32 to the cathode 25 of the battery. The emitter is connected to the anode 24 of the battery. An emitter biasing transistor 54 and capacitor 56 are connected in parallel with each other between the emitter and base of the transistor. When the momentary relay 28 picks up, the base of the transistor 50 is connected through the forward contact MOM–3 of the momentary relay to ground through a resistor 58 and a choke 59 which serve the conventional functions of current limiting and smoothing, and minimizing the effects of transients and voltages induced by nearby power lines or the like.

When an offhook condition is detected and the momentary relay 28 picks up, the base of the transistor 50 is grounded through the forward contact MOM–3. If the battery is not referenced at this time the only ground connection to the detector is to the base of the transistor 50, the battery becomes referenced to that ground and the transistor 50 remains cut off. If, however, it is the first subscriber 12 who has gone offhook, the battery is separately referenced to his d.c. ground connection, and the transistor is driven to saturation, causing the identifying relay 32 to pick up.

What is claimed is:

1. A circuit arrangement for automatic number identification between two subscribers who share a single channel in a subscriber carrier telephone system of the frequency-divided type in which two carrier signals are provided for each channel, one carrier for transmission from a central office terminal to a subscriber terminal shared by said two subscribers and the other carrier for transmission in the opposite direction, said arrangement comprising:
   a. means providing a d.c. ground connection to the tip and ring leads at the subset of one of the two subscribers who share the channel, the ground connection being through the subscribers' hookswitch contacts, the other subscriber being without a d.c. ground connection,
   b. an oscillator at the subscriber terminal connected selectively to modulate the subscriber terminal-to-central office terminal carrier,
   c. a detector at the subscriber terminal responsive to initiation of an offhook condition to energize said oscillator for a predetermined brief interval following the initiation of an offhook condition if the offhook condition is at the grounded subset, and to hold said oscillator de-energized at all other times,
   d. means at the central office terminal to demodulate the carrier signal received from the subscriber terminal and to detect the presence therein of a signal produced by said oscillator, and
   e. means responsive to said demodulating and detecting means for effecting a d.c. ground connection at the central office terminal readable by a conventional number identification system in the central office.

2. A circuit arrangement according to claim 1, wherein the subscriber terminal includes a battery and means for isolating the battery from all d.c. reference potentials except through the line leading to the subscribers, and said detector at the subscriber terminal comprises:
   a. a transistor,
   b. d.c. resistive means connected between the base and emitter of said transistor,
   c. a relay,
   d. means for connecting said relay in series with the collector-to-emitter path of said transistor and the battery, and
   e. means for connecting the base of said transistor to a d.c. reference leaving the battery isolated from all d.c. references except through said transistor and the line, whereby when the subscriber having the d.c. ground connection goes offhook, said transistor will conduct and said relay will be energized, and when only the subscriber without a ground connection goes offhook the only d.c. reference is through said transistor and said transistor will not conduct.

3. A ground detector circuit for use in a telephone system of the kind including a battery and a subscribers' line shared by two subscribers, means for isolating the battery from all d.c. reference potentials except through the line, means connecting a d.c. reference to the line through the hookswitch of one of the subscribers' subsets, and means isolating the other subscriber's subset from a d.c. reference, said detector circuit comprising:
   a. a transistor,
   b. d.c. resistive means connected between the base and emitter of said transistor,
   c. a relay,
   d. means for connecting said relay in series with the collector-to-emitter path of said transistor and the battery,
   e. means for connecting the base of said transistor to a d.c. reference leaving the battery isolated from all d.c. references except through said transistor and the line, whereby when the referenced subscriber goes offhook, said transistor will conduct and said relay will be energized, and when only the unreferenced subscriber goes offhook the only d.c. reference is through said transistor and said transistor will not conduct.

* * * * *